United States Patent [19]

Tuttle

[11] Patent Number: 4,767,940
[45] Date of Patent: Aug. 30, 1988

[54] ELECTRONIC SENSING AND CONTROL CIRCUIT

[75] Inventor: William C. Tuttle, Marietta, Ga.

[73] Assignee: Peachtree Patient Center, Inc., Atlanta, Ga.

[21] Appl. No.: 104,825

[22] Filed: Oct. 2, 1987

[51] Int. Cl.⁴ ............................................. H02P 7/68
[52] U.S. Cl. ................................... 307/116; 307/117; 318/55; 180/6.5; 180/167; 324/61 R
[58] Field of Search ..................... 318/587, 16, 38, 55; 361/179, 180, 181, 280, 282, 283, 289; 180/6.5, 16, 8.2, 216, 24.02, 214, 24.12, 907, 168, 167; 280/282; 307/116, 117; 324/61 R, 61 P, 61 QS, 60 CD; 73/862.38, 862.64

[56] References Cited

U.S. PATENT DOCUMENTS

| | | | |
|---|---|---|---|
| 3,774,238 | 11/1973 | Hardway, Jr. | 324/61 R |
| 3,795,146 | 3/1974 | Wilson | 324/61 R X |
| 3,826,979 | 7/1974 | Steinmann | 324/61 P X |
| 3,879,660 | 4/1975 | Piso | 324/61 R |
| 4,016,490 | 4/1977 | Weckenmann et al. | 361/181 X |
| 4,086,528 | 4/1978 | Walton | 324/61 R |
| 4,099,118 | 7/1978 | Franklin et al. | 324/61 QS X |
| 4,149,231 | 4/1979 | Bukosky et al. | 324/60 CD X |
| 4,208,625 | 6/1980 | Piso | 324/61 R |
| 4,232,300 | 11/1980 | Wright et al. | 324/61 P X |
| 4,237,421 | 12/1980 | Waldron | 307/116 X |
| 4,305,007 | 12/1981 | Hughes | 307/116 |
| 4,323,829 | 4/1982 | Witney et al. | 318/55 |
| 4,468,610 | 8/1984 | Hanson | 324/61 R |
| 4,694,279 | 9/1987 | Meno | 307/116 X |

Primary Examiner—William M. Shoop, Jr.
Assistant Examiner—Paul Ip
Attorney, Agent, or Firm—Jones, Askew & Lunsford

[57] ABSTRACT

An electronic sensing and control circuit is provided which includes a sensing plate and means for charging the sensing plate to a value dependent upon the capacitance existing between the sensing plate and a remote object. The capacitance between the sensing plate and the object varies with the distance of the object relative to the sensing plate. The sensing plate is periodically discharged and charged producing a useful current proportional to the capacitance and varying with the distance between the sensing plate and the object. Two sensing plates are used to provide first and second signals. The first and second signals are subtracted to derive a lateral displacement signal and added to derive a distance signal. The lateral displacement signal and the distance signal can be used to control the forward, reverse and turning motion of a motorized wheelchair.

41 Claims, 7 Drawing Sheets

ELECTRONIC SENSING AND CONTROL CIRCUIT

TECHNICAL FIELD

The present invention relates to an electronic sensing and control circuit of the type employing capacitive elements to sense the position or location of a remote object and produce an output signal for controlling or adjusting the environment of the object or altering the position of the object. The electronic sensing and control circuit of the present invention is particularly useful for controlling the operation of a motorized wheelchair.

BACKGROUND OF THE INVENTION

A wheelchair enables a person otherwise unable to move about to move from place to place with a degree of freedom. Motorized wheelchairs enable a user to move about with relative ease by manipulating a few wheelchair controls. Wheelchair controls are typically hand operated devices but there are wheelchair controls adapted for special needs. A special need may exist where the wheelchair user does not have use of the hands to operate the controls.

These special needs have been addressed in part by providing wheelchair control systems that rely on leg operated, chin operated and head operated controls. Controls that utilize movement of the head to activate wheelchair controls exist which use reflecting mirrors attached to the head and movable with the head while others use ultrasonic techniques to bounce sound waves from the head and thus determine its position for controlling the wheelchair. Wheelchair control systems of these types are described in U.S. Pat. Nos. 3,374,845; 3,965,402; 3,993,154; 4,281,734; 4,093,037; and 4,679,644.

U.S. Pat. No. 3,761,736 describes a proximity switch operating on a capacitance principle to detect changes in capacitance occurring when an object comes in close proximity to the switch. Capacitance principles are also employed in the apparatus of U.S. Pat. No. 3,993,154 wherein a low power signal is carried by a conductor to a thin conductive metal foil located in a back rest portion of a motorized wheelchair. Conductive metal field pickup or skin contact elements are supported at a location on the wheelchair where they may be momentarily contacted by any exposed skin portion of the wheelchair user. The conductive field pickup elements are separated from each other so that they may be individually and selectively contacted. The foil acts as a radiating source by virtue of being connected to an oscillator to thereby radiate the energy field into the body of the wheelchair user.

A drawback of sensing circuits used for wheelchair controls is that contact with the body is required. Such contact may take the form of a helmet or mirrors attached to the head or may take the form of physical body contact with part of a wheelchair. It will be appreciated that it would be highly desirable to provide a sensing circuit for a wheelchair control that does not involve physical contact with the user's body and does not hinder the user's field of vision or mobility.

Another sensing circuit utilizing capacitive elements uses a pair of capacitors in conjunction with a diode bridge. This circuit uses a pair of capacitors to produce a speed signal and another pair to produce a turn signal. In controlling wheelchair speed, one plate of a capacitor is attached to a movable portion of the wheelchair or a movable plate attached to the wheelchair. Understandably, with both the speed sensor and the turn sensor requiring two capacitors each, the circuitry tends to be fairly complicated and bulky. In addition, movement of at least two body parts is required with one part used to vary speed and the other used to control turn direction. Also, the diode bridge-capacitor type detector circuit detects spontaneously anything that is fed to it and is therefore highly subjective to external field effects, such as radio frequency waves. Accordingly, it will be appreciated that it would be highly desirable to have a simple sensing circuit for a wheelchair control providing a simple, nonobtrusive interface with the user that is free of interference from ever present radio frequency waves.

SUMMARY OF THE INVENTION

The present invention is directed to overcoming the problems set forth above. Briefly summarized, in accordance with one aspect of the invention, an electronic circuit senses the distance to an object. The electronic circuit includes a single sensing plate and means for charging the sensing plate to a value dependent upon the capcitance existing between the sensing plate and the object. The capacitance between the single sensing plate and the object varies with the distance of the object relative to the sensing plate. The electronic circuit also includes means for discharging the sensing plate and for producing a current proportional to the capacitance and varying with the distance between the sensing plate and the object.

The electronic circuit effectively senses the distance to the object using a single sensing plate. Where the object is the human body and the sensing plate is embedded in a part of a wheelchair, the body need not be grounded to the frame of the wheelchair because the capacitance involved is very small and the capacity of the human body is sufficiently large that an effective return path exists without the necessity of being grounded or in physical contact with the wheelchair. The capacitance varies with the distance between the sensing plate and the object and the current is proportional to the capacitance so that the current varies with the distance between the sensing plate and the object.

According to another aspect of the invention, an electronic circuit senses the two-dimensional position of a dielectric or electrically conducting object. The electronic circuit includes a left sensing plate and a right sensing plate, each forming a capacitor with the object. The capacitance existing between each of the sensing plates and the object varies with the position of the object relative to each respective plate. The circuit includes means for charging the left and right sensing plates in proportion to the capacitance existing between each of the sensing plates and the object. The circuit also includes means for discharging the left and right sensing plates and for producing left and right current signals directly proportional to the capacitance existing between each of the sensing plates and the object. The circuit includes means for subtracting the left and right signals and deriving a lateral displacement signal and means for adding the left and right signals and deriving a distance signal.

The lateral displacement signal and the distance signal can be used to control the motion of a wheelchair. Where the object is the human body, the electronic circuit can provide two-dimensional data proportional to body part movement, such as head forward tilt and lateral tilt. The head forward tilt and lateral tilt is the head movement needed for wheelchair control and such movement of the head is a natural, simple, low effort movement a person having limited range use of the head can achieve.

It is an object of the present invention to provide an electronic sensing and control circuit for sensing the spatial position of a dielectric or electrically conducting object and generating control signals for a machine interface to control operation of a machine in response to the position of the object. This object is achieved by generating a two-dimensional control signal useful for controlling two parameters of machine operation, such as speed and direction or position. This provides a useful master/slave system for remote operations.

It is also an object of the present invention to provide an electronic sensing circuit for sensing the position of a wheelchair user's head to produce signals for controlling movement of the wheelchair without physically attaching sensing devices to the user and with no mechanical contact with the user. It is a feature of this invention that the forgoing object is achieved with the electronic sensing circuit. The electronic sensing circuit has sensor plates embedded invisibly in a wheelchair head rest located entirely behind the user's head. The capacitance existing between the user's head and each of the plates is used to provide two-dimensional positional data proportional to body part movement such as forward tilt and lateral tilt of the head. Only two sensing plates are required to derive signals representative of both lateral movement for turning the wheelchair and forward movement for controlling the speed of the wheelchair in the forward or reverse direction. An advantage provided by the two sensing plates is that a minimum of parts is required and the sensing plates are completely embedded in the head rest and out of sight. In addition to being cosmetically pleasing, such an arrangement does not obstruct the user's field of vision or interfere with movement of the head.

Another object of the invention is to provide an electronic control circuit for proportional control of a wheelchair that relies on movement that is intuitive to the user. It is a feature of the inventin that the foregoing object is achieved by using only two sensing plates to provide two-dimensional positional data proportional to body part movement. The body part movement is forward tilt and lateral tilt of the head. The sensing circuit operates with full control over a range of head motion as great as perhaps six inches to as little as a fraction of an inch. This feature is advantageous in that only small amounts of head movement are sufficient to generate signals effective to operate a wheelchair. To maneuver the wheelchair, the user's head is merely gently tilted in space in the desired direction of travel. This head control scheme is intuitive to the user resulting in a quickly learned precise maneuvering ability.

Other aspects, object, features and advantages of the present invention will become apparent to those skilled in the art upon reading the detailed description in conjunction with the accompanying drawings and appended claims.

DETAILED DESCRIPTION OF THE INVENTION

Figure 1:
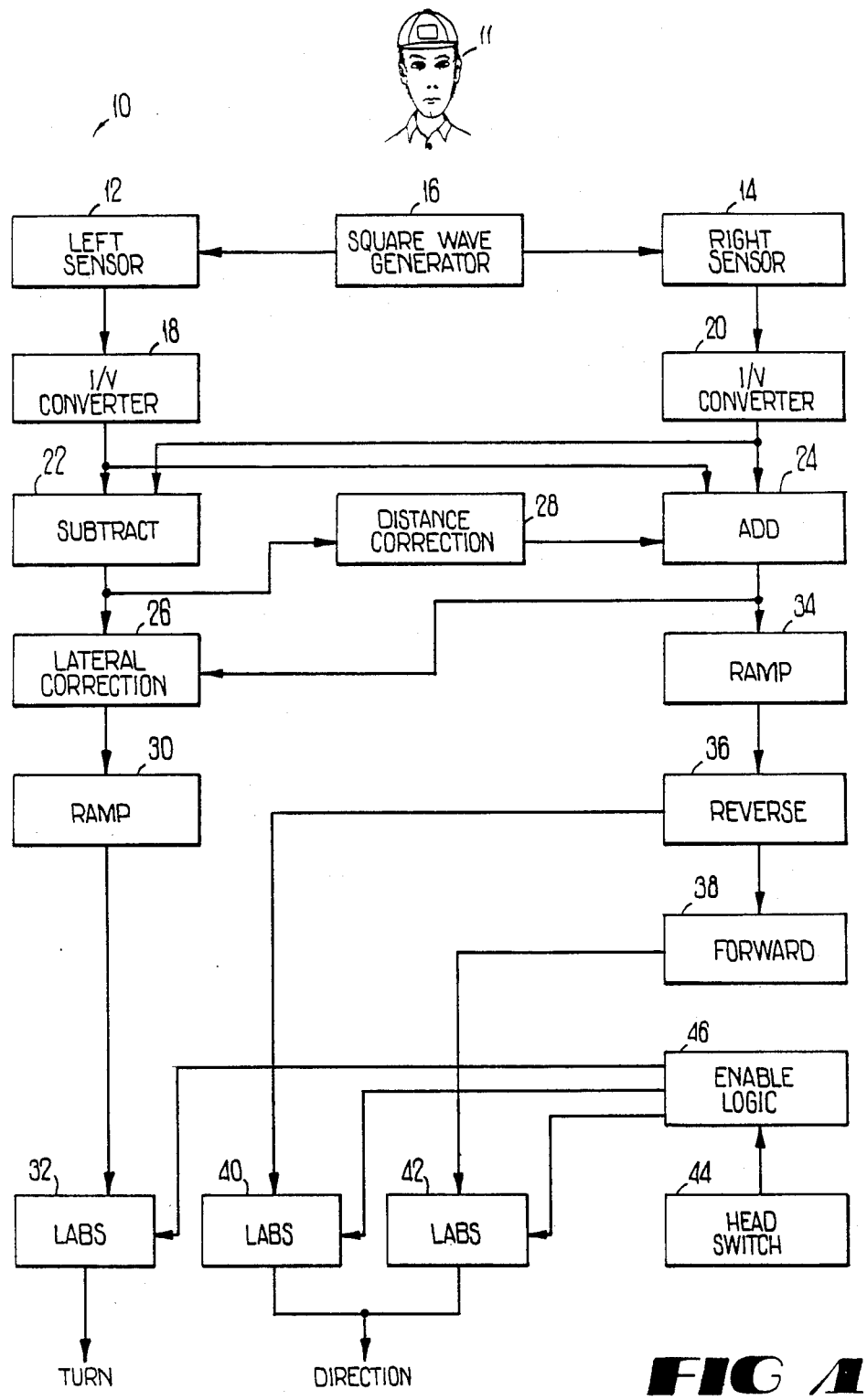
FIG. 1 is a simplified block diagram of a preferred embodiment of an electronic sensing and control circuit for controlling operation of a wheelchair.

Referring to FIG. 1, an electronic circuit 10 senses the position of a dielectric or electrically conductive object 11. The circuit 10 as illustrated includes a left sensor 12 and a right sensor 14. The left and right sensors 12, 14 together can provide two-dimensional positional data but it is to be understood that either the left sensor 12 or the right sensor 14 can provide one-dimensional positional data such as the relative distance to the object 11. A square wave generator 16 clocks the sensors 12,14 facilitating the output of current signals that are converted by current to voltage converters 18 and 20, respectively, to left and right voltage signals.

It is anticipated that the sensing circuit 10 will be utilized to control the motion of a wheelchair or other motorized equipment, or to provide control signals for operating any apparatus dependent on the position of an object capable of developing a capacitance between the object and the sensing elements of the circuit.

The left and right voltage signals are subtracted by subtraction circuit 22 to derive a lateral displacement signal. Similarly, the left and right voltage signals are added in addition circuit 24 to derive a distance signal. A lateral correction circuit 26 and a distance correction circuit 28 compensate for inaccuracies caused by the geometry of the system between the sensors 12, 14 and the object 11.

The corrected lateral signal is fed through a ramping circuit 30 and is output through a linear analog bilateral switch (LABS) 32 whose output is a turn signal useful for controlling a motorized wheelchair during a turn.

The corrected distance signal emanating from adder 24 is similarly fed through ramp 34 and generates reverse and forward speed signals. The reverse direction signal is generated by reverse circuitry 36 and the forward direction signal is generated by forward circuitry 38. The reverse signal is fed through LABS 40 and the forward direction signal is fed through LABS 42. The outputs of the LABS 40, 42 comprise a directional speed signal useful for controlling forward and reverse movement of a motorized wheelchair. A head operated switch 44 activates enable logic circuitry 46 to control operation of the LABS 32, 40, and 42.

Figure 2:
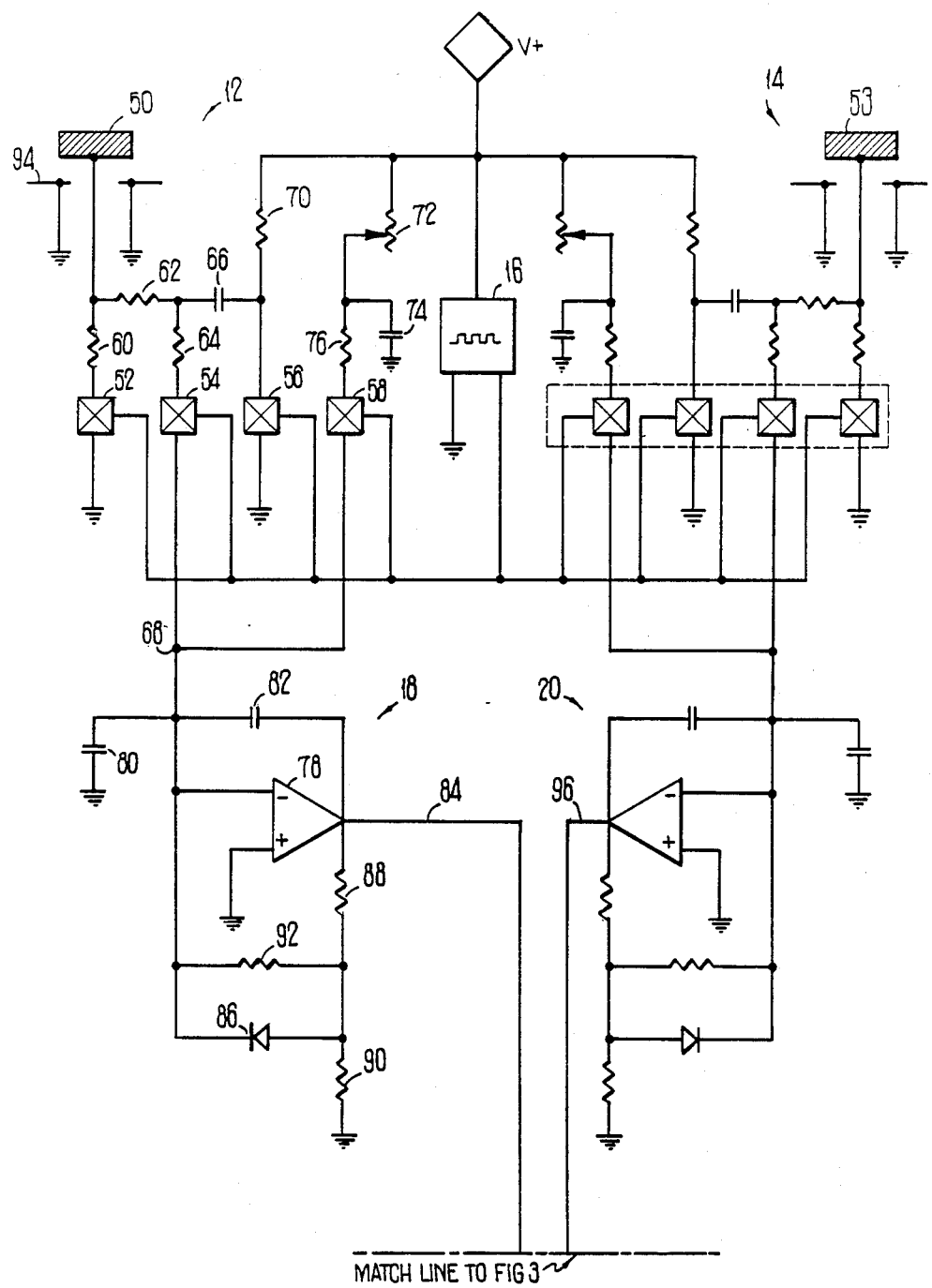
FIG. 2 is a schematic diagram of a preferred embodiment of the left and right sensor and associated current to voltage converter circuits illustrated in the block diagram of FIG. 1 and is connected to FIG. 3 along the match line.

Referring now to FIG. 2, the left and right sensors 12, 14, the square wave oscillator 16, and the current to voltage converters 18, 20 are illustrated in greater detail. The left and right sensors 12, 14 are identical as are the left and right current to voltage converters 18, 20. Because the left sensor and converter are identical to the right sensor and converter, only the left sensor and converter will be described in detail. It is to be understood that the right sensor and right current to voltage converter are constructed identical to the left hand components and operated in the same manner.

Figure 7:
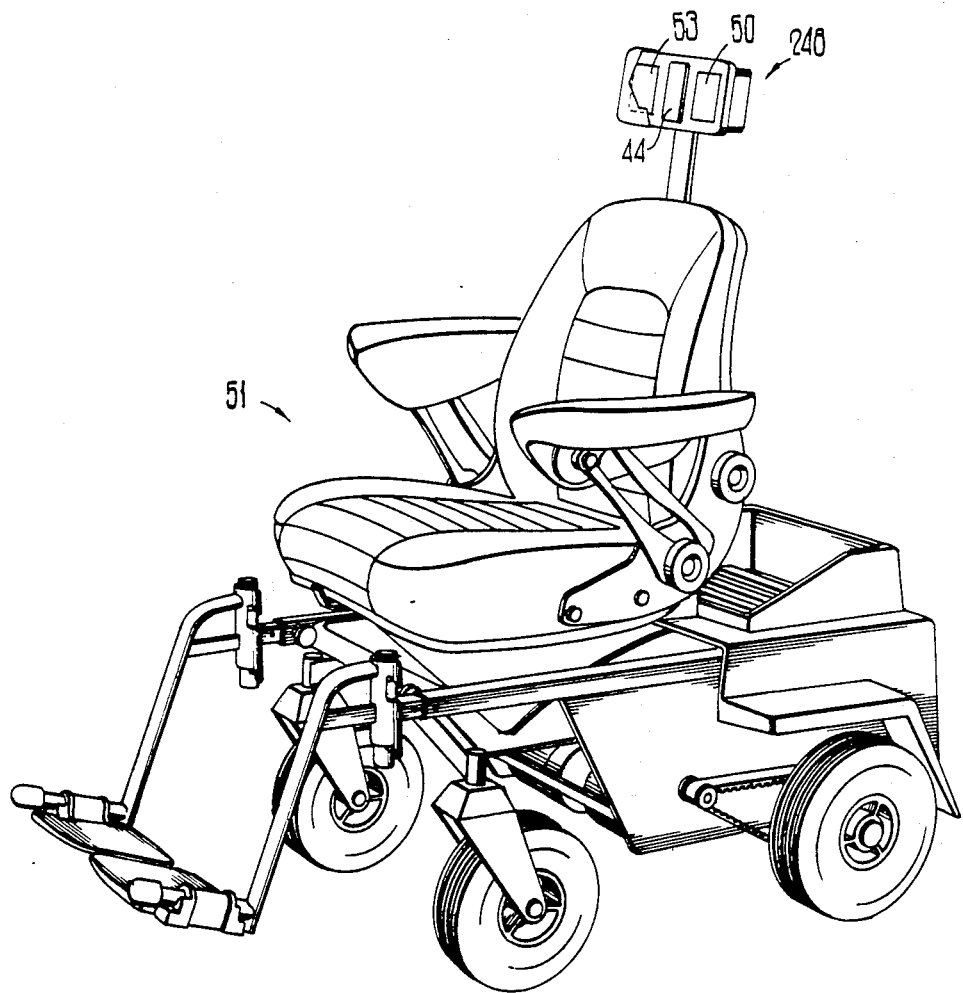
FIG. 7 is a diagrammatic view of a wheelchair incorporating the preferred embodiment of the electronic sensing and control circuit of the block diagram of FIG. 1.

The left sensor 12 includes a left sensing plate 50. When used as a head position sensor, the left sensing plate 50 is preferably embedded in the head rest of a wheelchair, such as wheelchair 51 (FIG. 7). In a wheelchair headrest, the left sensing plate 50 has a surface area of approximately 12½ square inches. It has been found that with a 12½ square inch sensing plate, the capacitance between a wheelchair user's head and the plate 50 varies from approximately 5 pf at ½ inch distance between the user's head and the sensing plate to about 0.5 pf at a distance of approximately 5 inches. The capacitance between the sensing plate 50 and the head varies with distance. The two plates are each preferably 2½ inches wide by 5 inches high for an area of 12½ square inches. Their separation laterally is 1¾ inches. This is not critical, but has shown to work well during tests in terms of dimensions and sensitivity to motion. Other dimensions of the plates will also work with adjustments to the gain of the amplifiers to compensate for more or less capacitance because of the plate dimensions.

Capacitance is being measured as a function of distance. The capacitive pathway or circuit is essentially from the sensing plate 50 to the head and the body acts as a return capacitance path back to a circuit ground. Because of the small sensing capacitance involved and the relatively large size of a human body, the body acts as a return path just by virtue of physical nearness. Using the body for return capacitance could work over a distance of several feet and still provide sufficient return caacity because of the total overall size of the body as mentioned. However, at a distance of several feet the sensing capacitance is very, very small and it would be impractical to use such a small capacitance. It has been observed that excellent wheelchair control can be obtained by moving the head only a few inches.

The left sensor 12 also includes four linear analog bilateral switches (LABS) 52, 54, 56 and 58 that are simultaneously switched under the control of the square wave oscillator 16. The LABS 52, 54, 56 and 58 are preferably combined in a single package, such as a CD 4066 for example. As illustrated the first and third switches 52, 56 complete paths to the circuit ground. The path to ground through the first switch 52 is through a resistor 60 attached to the left sensing plate 50. Also attached to the left sensing plate is one terminal or end of a resistor 62. The other end of resistor 62 is connected to resistor 64 and capacitor 66 with the other end of resistor 64 connected to the second switch 54.

The output of the switch 54 goes through a junction 68 wherein the charge current from the left sensing plate 50 can be measured. The charge current at junction 68 is a current proportional to the capacitance existing between the left sensor plate 50 and the user's head.

The end of the capacitor 66 opposite resistors 62 and 64 is connected to resistor 70 and to the third switch. The other end of resistor 70 is connected to the positive voltage source. Preferably attached to the positive voltage source is a variable resistor 72 that is connected to one end of a bypass capacitor 74 that has its other end grounded and to one end of a resistor 76 that has its other end connected to the fourth switch 58.

The square wave oscillator 16 acts as a clocking drive to the switches 52, 54, 56, and 58. The square wave oscillator simultaneously clocks all eight switches on at one time. The square wave oscillator preferably has an output peak to peak voltage close to supply voltage, and a frequency and duty cycle stability of ±0.01% in order to provide temperture stable operation of the entire sensing circuit. This is a desired stability over the ambient temperature range. The operating frequency of the square wave oscillator can be anywhere from 400 to 500 kilohertz. The value is not critical as long as it is stable.

The switches are operated simultaneously by the square wave oscillator 16. The first switch 52 is used to ultimately discharge the left sensing plate 50 and free it to charge during open time. The third switch 56 controls charging of the sensing plate 50. The charging current in the plate 50 during the charging cycle is measured by transfer capacitor 66. During the charging cycle, electron flow is from the plate 50 through isolation resistor 62, transfer capacitor 66 and pull-up resistor 70 that is connected to the source of positive voltage. This charging current creates a charge on capacitor 66 proportional to the magnitude of the charging current in the sensing plate 50, which in turn is proportional to its instantaneous capacitance. The stored charge in capacitor 66 is held at this point, and, on the half cycle where all the switches 52, 54, 56, and 58 are turned on from the square wave oscillator 16, that charge is dissipated into the current to voltage amplifier 18 through the junction 68. This occurs via the pathway of electron flow from circuit ground through the third switch 56, the transfer capacitor 66, resistor 64 and through the second switch 54 into junction 68.

The fourth switch 58 provides an opposing current flow equal to the current flow attributable to the system residual capacitance so it is only necessary to detect the change of capacitance involved in distance measuring. The opposing current flow is opposite to that current which came during the switch on time with electron flow through the third switch 56, capacitor 66, resistor 64, and second switch 54 into the junction 68.

The flow now is opposite being from the junction 68 through the fourth switch 58 and resistors 76 and 72 to the positive voltage supply. This can effectively cancel the current at the junction 68 generated by the residual capacitance in the system. Part of the residual capacitance is included in the switches 52, 54, 56 and 58, part is distributed wiring capacitance, and a very large part is the capacitance between the back side of the sensing plate 50 and the surrounding electronic equipment. Variable resistor 72 would be set to achieve the desired current cancellation.

The purpose of the series charging resistor 62 is to prevent the rapid discharge of the transfer capacitor 66 during the switch close time, when sensing plate 50 is discharging, so that the bulk of the capacitor 66 charge is delivered to junction 68. The charging resistor 62 should be approximately ten times the value of the equal series resistors 60, 64, and 76. The series resistors 60, 64 and 76 are of equal value and probably approximately 30 times the on resistance of the linear analog bilateral switches. The purpose of the series resistors 60, 64 and 76 is to minimize the adverse effects of temperature dependent variation in the on resistance of the linear analog bilateral switches.

The operation of the right side sensor 14 is identical to the left side sensor 12 and is necessary to operate the sensing and control circuitry as a two-dimensional detector. While either the left sensor or the right sensor alone is able to detect a change in capacitance due to a change in the distance between a sensing plate and the object to be sensed, each can provide only a one-dimensional interpretation of the distance between the sensor and the object. On the other hand, when both sensors are used, two-dimensional data can be obtained.

The square wave oscillator 16 simultaneously clocks all eight linear analog bilateral switches on at one time and preferably operates at a frequency from about 400 kilohertz to about 500 kilohertz. Below about 400 kilohertz detection sensitivity suffers unless a larger capacitance is used for the sensor. Above about 500 kilohertz, there is excessive current in the switch path of the third switch 56 through resistor 70 to the supply voltage. The value of the resistor 70 should be such as to achieve a full charge of the sensor plate at the operating frequencies. In other words, the RC time constant of the total sensing circuit capacitance and resistor 70 must be such that there is virtually full charge attained during the charging time period. The value of the transfer capacitor 66 should be approximately 15 times the total sensing circuit caacitance involved. Also, the transfer capacitor 66 should have a zero temperature coefficient for stable operation of the circuit.

At junction 68, there is present a current inversely proportional to the distance of the object 11 from the sensor plate 50 and this current is availabe for input to the current to voltage converter 18. The current to voltage converter 18 includes an operational amplifier 78 having its non-inverting input grounded and its inverting input connected to the junction 68. A small bypass capacitor 80 is connected to the inverting input of the amplifier. The bypass capacitor 80 has one side grounded to smooth the current to a smaller value of voltage variation so the inverting input of the amplifier 78 is not subjected to large negative excursions. A gain compensation capacitor 82 is connected between the inverting input and the output of amplifier 78. The purpose of the capacitor 82 is that of gain compensation of the amplifier feedback loop and should be appropriately chosen.

The remainder of the feedback network addresses the non-linear characteristic of capacitance versus distance. The relationship of capacitance versus distance is an inverse proportional relationship by nature. Therefore, the current at junction 68 is in non-linear inverse relationship to distance from the sensor and rises or increases rapidly as the distance is reduced toward zero. To make the distance interpretation of the sensor a linear output voltage at point 84, a non-linear element is used in the feedback, namely diode 86. The cathode of diode 86 is connected to the inverting input of amplifier 78 and the anode of diode 86 is connected to the junction of resistors 88, 90 and 92. The diode 86 is connected in parallel with resistor 92. Resistor 88 has one end connected to the output of amplifier 78 and is connected in series with resistor 90 which has one end grounded.

The logarithmic forward voltage-forward current relationship of a silicon diode is utilized to make the distance interpretation at the sensor and the output voltage at point 84 an inverted linear relationship. The logarithmic relationship essentially compensates for the nonlinear distance-capacitance realtionship at the sensor. To best achieve linearity, the feedback network is constructed so that resistors 88 and 90 produce a feedback voltage sufficient to cause silicon diode 86 to go into heavy conduction as the output of the amplifier at point 84 swings to a maximum. The individual values of the resistors are not important; it is the ratio of resistors 88 and 90 that is critical. The value of resistor 92 is selected to achieve an initial gain of the amplifier 78.

The initial gain of the amplifier 78 should be approximately three volts per microamp with a 12½ square inch detector plate 50. A greater gain will be required with a smaller detector plate area. The resistors within the sensor and current to voltage converter circuits should all be of the low temperature coefficient variety to insure temperature stability of the circuit. The supply voltage for the circuitry should be between about 8 and 14 volts. While the voltage is not particularly critical, it is important that the voltage selected be regulated so that it varies no more than about ±0.1% over the ambient temperature range and supply and load variation range of the equipment. It has been found that at voltages below approximately 8 volts, there is poor detector sensitivity and at voltages above approximtely 14 volts, a needlessly high field intensity external to the device is present.

The nature of the detection process is synchronous and there is no detection that can be described as non-linear current flow, except as directed by the square wave switching oscillator 16. Therefore, an external radio frequency field will not produce a change in average current flow at any point in the circuit because all portions of the circuit are bidirectionally linear. Any signal frequency that is an exact multiple of the switching frequency is capable of inducing some amount of interference. What a signal must be to interfere with the sensing circuit 10 is precisely defined. This is unlike the prior art diode bridge-capacitor type detector that detects spontaneously anything that is fed to it and therefore is highly subjective to external field effects. The output of the present detector is essentially immune to external fields.

The present invention, unlike earlier diode-capacitor sensors, has great immunity to outside radio frequency interference. The use of the synchronous detector and its linear switching of elements eliminates diode temperature dependency effect giving great stability. A major advantage of the electronic sensor is that each sensing unit is capable of operating in a single ended fashion to measure distance from the sensor to the object of interest without the aid of a differential pair of capacitors wherein the object's relative distance between the two capacitors can be readily measured, but, when implemented in a real world detection system, is not a very convenient configuration.

The present invention has been tested in the presence of a 50 kilowatt AM broadcast station. While testing within a few feet of the radiating antenna, the circuitry did not develop any interference at a frequency of operation of the sensing device of 450 kilohertz and a frequency of operation of the broadcast transmitter of 750 kilohertz. Also, the ground plate symbol 94 next to the left sensor 50 is indicative of the metal enclosure for the electronics of the circuitry. This provides protective shielding of the sensing field on the backside of the equipment which is desirable in wheelchair control applications.

Figure 3:
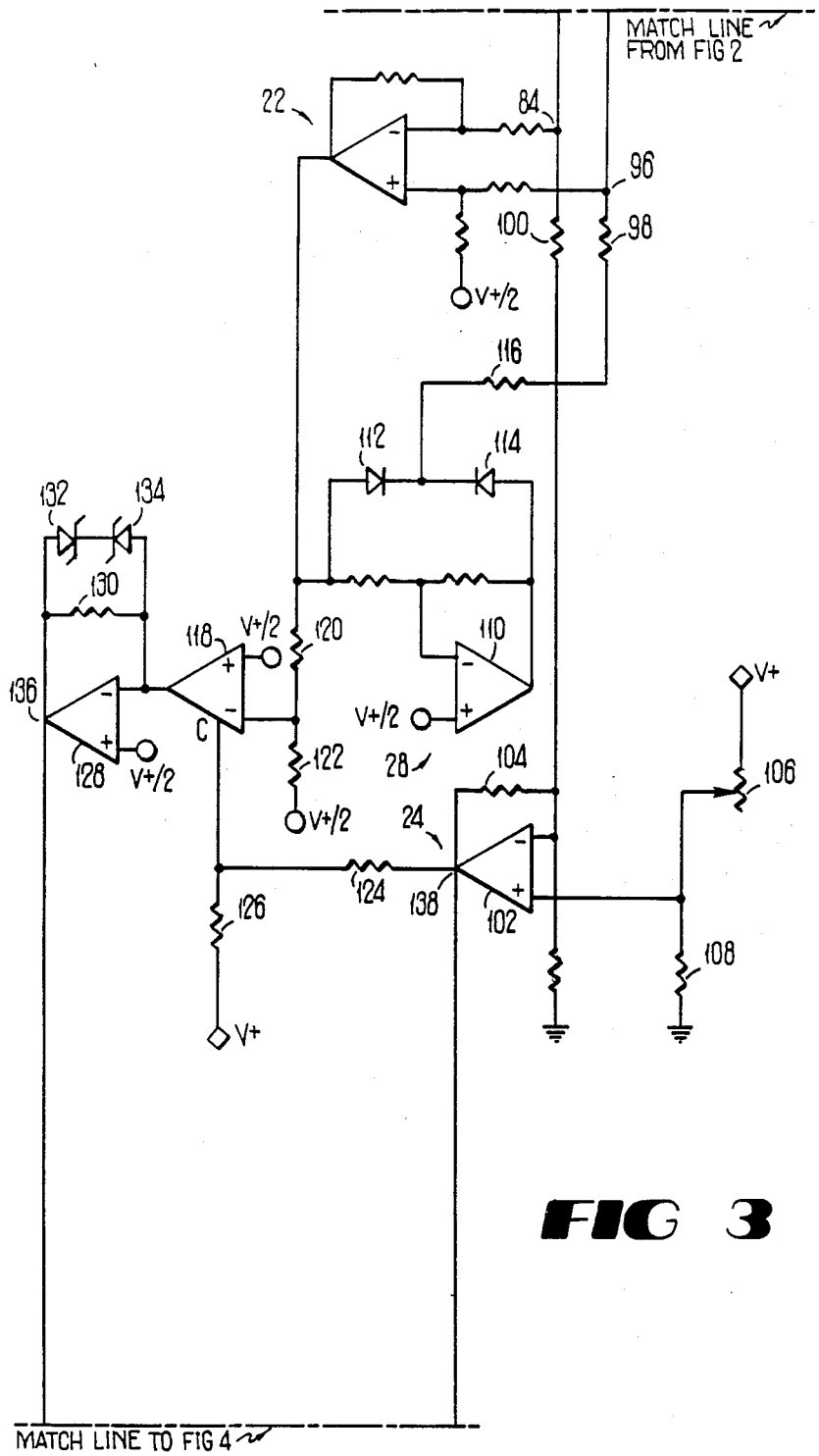
FIG. 3 is a schematic diagram of a preferred embodiment of the addition, subtraction and correction circuits illustrated in the block diagram of FIG. 1 and is connected to FIGS. 2 and 4 along the match lines.

The converted voltage signal from the left sensor 12 and the left current to voltage converter 18 appears at point 84 in FIG. 2 and at point 84 in FIG. 3. It is understood that points 84 in FIGS. 2 and 3 are the same electrical point. Similarly, the converted voltage signal from the right sensor 14 and right current to voltage converter 20 appears at point 96 in FIGS. 2 and 3.

Referring to FIG. 3, the outputs from the left and right sensors 12, 14 are received at points 84 and 96 respectively. This portion of the circuitry derives displacement outputs from the distance sensed to each of the two plates as physically configured. What is desired to be achieved is an output that has a component a distance away from the plates collectively It is also desired to produce an output proportional to the lateral displacement between the plates to achieve a two-dimensional control space.

To obtain the lateral displacement output, the left and right sensor signals are subtracted in using the subtraction circuit 22. The subtraction circuit 22 is a standard unity gain differential amplifier configuration with an amplifier and four resistors associated with it. The output of the subtraction circuit 22 is proportional to the difference of position between the left sensor 12 and right sensor 14 relative to the object. The output varies above and below a value of ½ of supply voltage, (+V/2), to which the amplifier of the subtraction circuit 22 is referenced. The output would be positive going for right movement and negative going for left movement.

To obtain a distance responsive output, the left and right sensor signals are added in the adder 24 having summing amplifier 102. The output of the summing amplifier 102 is representative of the total distance away from the sensing array of both the left and right sensors. This output is a voltage and it varies from zero volts for zero distance away to maximum amplifier swing positive for maximum distance away. The sensitivity of the range of control is determined by resistor 104 which is connected at one end to the output of amplifier 102 and at the other end to the inverting input of amplifier 102 and to one end of summing resistors 98 and 100. The other ends of summing resistors 98 and 100 are connected to the right sensor at point 96 and the left sensor at point 84 respectively. Point 84 is also connected to the inverting input of the subtraction circuit 22 while point 96 is connected to the non-inverting input thereof. Physical distance for full control range is determined by the magnitude of resistor 104. Variable resistor 106 and fixed resistor 108 form a voltage divider network which provides the zero output set point by adjusting variable resistor 106 so that there is zero volts at the output of amplifier 102 at zero distance.

As described, without geometric correction circuitry, the outputs at the output of the subtraction circuit 22 and the output of summing amplifier 102 will be non-linear with respect of motion. Mainly, the output at amplifier 102 will change as lateral displacement occurs because, in effect, at that point the distance from either sensor to the sensed object is changing. To compensate for this, the lateral output of the subtraction circuit 22 is fed into a full wave rectifier circuit 28 to derive a correction signal. The full wave rectifier distance correction circuit 28 includes an operational amplifier, 110 configured as a unity gain inverter, and two diodes 112, 114, one on the input and one on the output to achieve a full wave signal varying with the displacement from a neutral position at the sensors. The output varies upward with the dislacement in either direction, left or right, without regard to what direction. This is summed via resistor 116 at the input of amplifier 102, producing the required correction signal that will result in essentially a linear output at the output of amplifier 102 regardless of the lateral displacement.

Likewise, curvature in the lateral detection field exists due to the geometry of the system between the sensors and the detected object. The output of the subtraction circuit 22 will have a greater magnitude for a given amount of lateral displacement when the detected object is close to the sensors than it does when the object is at a greater distance from the sensors. Essentially, what must be done is raise the gain of the circuit responsive to distance to the detected object.

This raise in the gain is accomplished by taking a corrected sample of the distance signal at the output of the amplifier 102 and applying it to a gain control amplifier 118 that will exhibit an increase in gain when a greater distance is sensed at the output of amplifier 102. The amplifier 118 is part of the lateral correction circuit 26 and is preferably an operational transconductance amplifier which is essentially a voltage to current conversion amplifier whose transconductance ratio can be varied via a controlled current input. Amplifier 118 is also referenced to +V/2. Resistors 120 and 122 form a signal attenuation circuit to stay within the differential voltage input range of the amplifier 118. The magnitude of the gain correction is determined by the value of resistor 124 for the maximum range. At close range, the gain control current is set by the value of resistor 126. The output current of the amplifier 118 is converted to a voltage by a current to voltage converter amplifier 128. Physical movement for full control range is determined by the magnitude of resistor 130. To achieve a symmetrical limiting of this voltage, zener diodes 132 and 134 are connected back to back to produce a symmetrical limiting of the output.

By this construction, a lateral displacement output signal is produced at point 136 while a distance output signal is produced at point 138. These signals are corrected signals that compensate and account for the position of the object relative to both plates.

Figure 4:
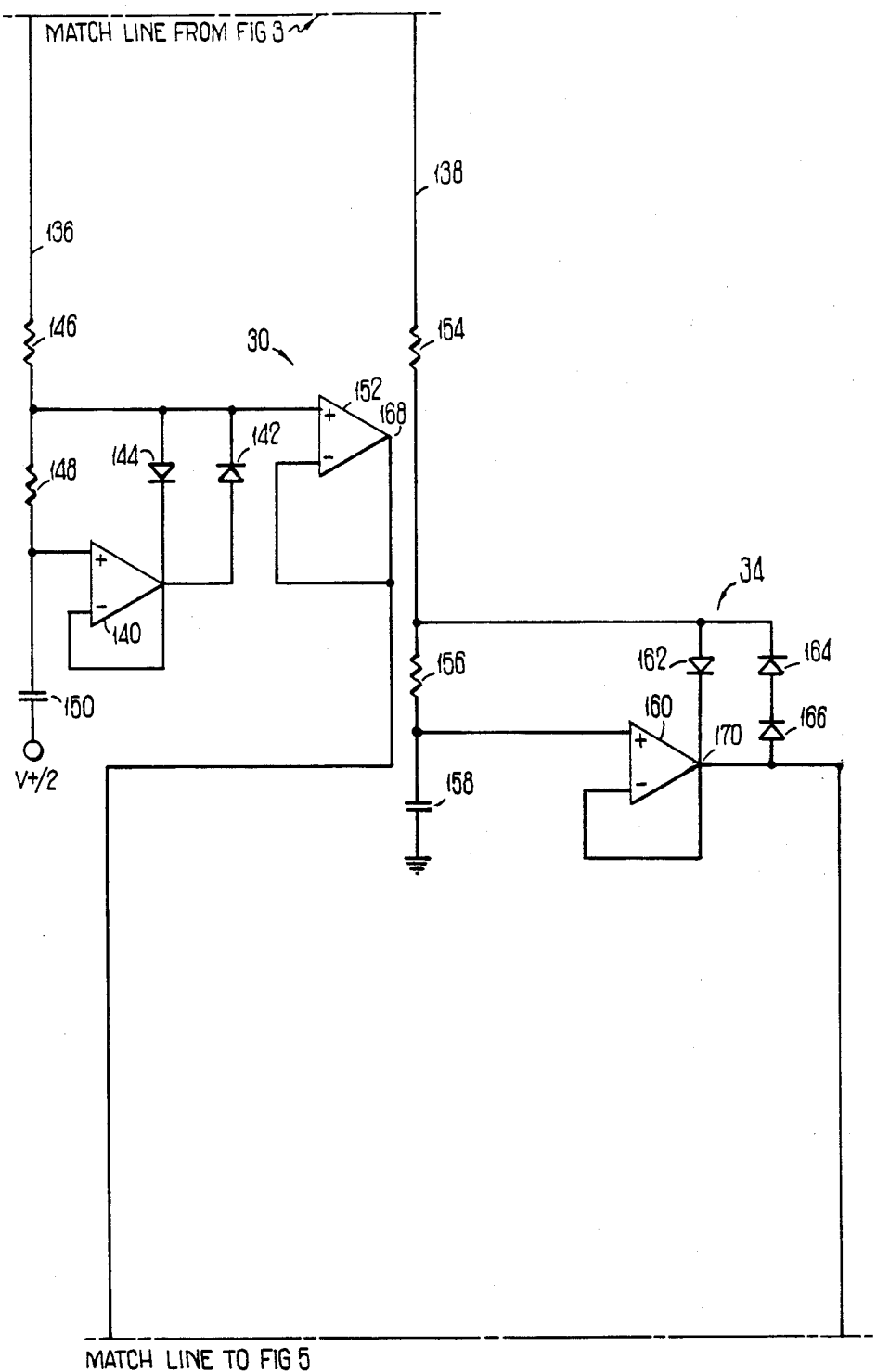
FIG. 4 is a schematic diagram of a preferred embodiment of the ramp circuits illustrated in the block diagram of FIG. 1 and is connected to FIGS. 3 and 5 along the match lines.

Referring now to FIG. 4, the lateral displacement and distance signals are processed further to produce a wheelchair control output. Response time filtering is provided and is essential when using the sensing and control circuit as a head control. Without adequate response time filtering, inertially induced head movements could cause erroneous control inputs. However, while providing response time filtering, the filtering must not be so extensive as to limit the controllability of the wheelchair. Response time filtering is accomplished by feeding the lateral dislacement signal from point 136 into a ramping circuit 30.

The ramping circuit 30 is composed of a voltage follower 140 and diodes 142 and 144 to produce a linear time ramp of the output. Point 136 is connected to a resistor 146 which is connected in series with resistor 148 and capacitor 150. The free end of the capacitor 150 is connected to a reference voltage of +V/2. The junction between resistors 146 and 148 is connected to the noninverting input of buffer amplifier 152. The inverting input of buffer amplifier 152 is connected to the output of buffer amplifier 152 and is the turn output of the ramp circuitry 30. The junction between resistor 148 and capacitor 150 is connected to the noninverting input of voltage follow amplifier 140. The inverting input of voltage follower amplifier 140 is connected to its output. The diodes 142 and 144 are connected in antiparallel fashion between the output of voltage follower amplifier 140 and the noninverting input of buffer amplifier 152.

As can be seen, the voltage follower amplifier 140 is essentially a noninverting integrator. The optimum time of full swing has been found to be approximately one second and therefore resistor 148 and capacitor 150 are chosen to produce such time effects. The value of current limiting resistor 146 should be approximately one tenth of the value of resistor 148. The portion of the input directly fed out is to enhance maneuverability of the wheelchair. By feeding a small portion of the would-be turn signal through, it improves maneuverability by essentially staying ahead of the desired command to turn the wheelchair. If this were not done, the turn effects would be much delayed and when some turn was finally achieved, over-steering could result. This signal is fed to buffer amplifier 152 whose output is designated a turn output signal. No further processing is required of this signal for it to be an effective wheelchair turn control signal.

The distance input signal is likewise processed by a ramping circuit 34. The signal from point 138 is received by resistor 154 which is connected in series with resistor 156 and capacitor 158. The other side of capacitor 158 is grounded. The junction between resistor 156 and capacitor 158 is connected to the noninverting input of voltage follower amplifier 160. The inverting input of voltage follower amplifier 160 is connected to its output. The junction between resistor 154 and resistor 156 is connected to the anode of diode 162. The cathode of diode 162 is connected to the output of amplifier 160. Diodes 164 and 166 are connected in series with each other and the string of diodes 164 and 166 is connected in antiparallel to diode 162. The output from the amplifier 160 is the speed output. This output controls the speed and the circuitry should be set for a ramp time of approximately 1.8 seconds on acceleration and 0.9 seconds on deceleration.

The difference is derived by the fact that in one direction there are two diodes 164 and 166 dropping the driving voltage for capacitor 158 and in the other direction one diode 162. This two to one ratio of the time is found in practice to be very adequate for wheelchair control and produces a side benefit that when operating on a rough surface, if the head is rather violently jostled about, the effect is to slow down the wheelchair due to the unbalance in timing of the circuit. In other words, the net average will be less than the input average, because of the non-linear time relationship between rising ramp and falling ramp. So resistor 156 and capacitor 158 should be chosen to produce a positive going tome of 1.8 seconds for full swing of this amplifier. Resistor 154 is a current limiting resistor and is approximately one tenth of the value of resistor 156.

Figure 5:
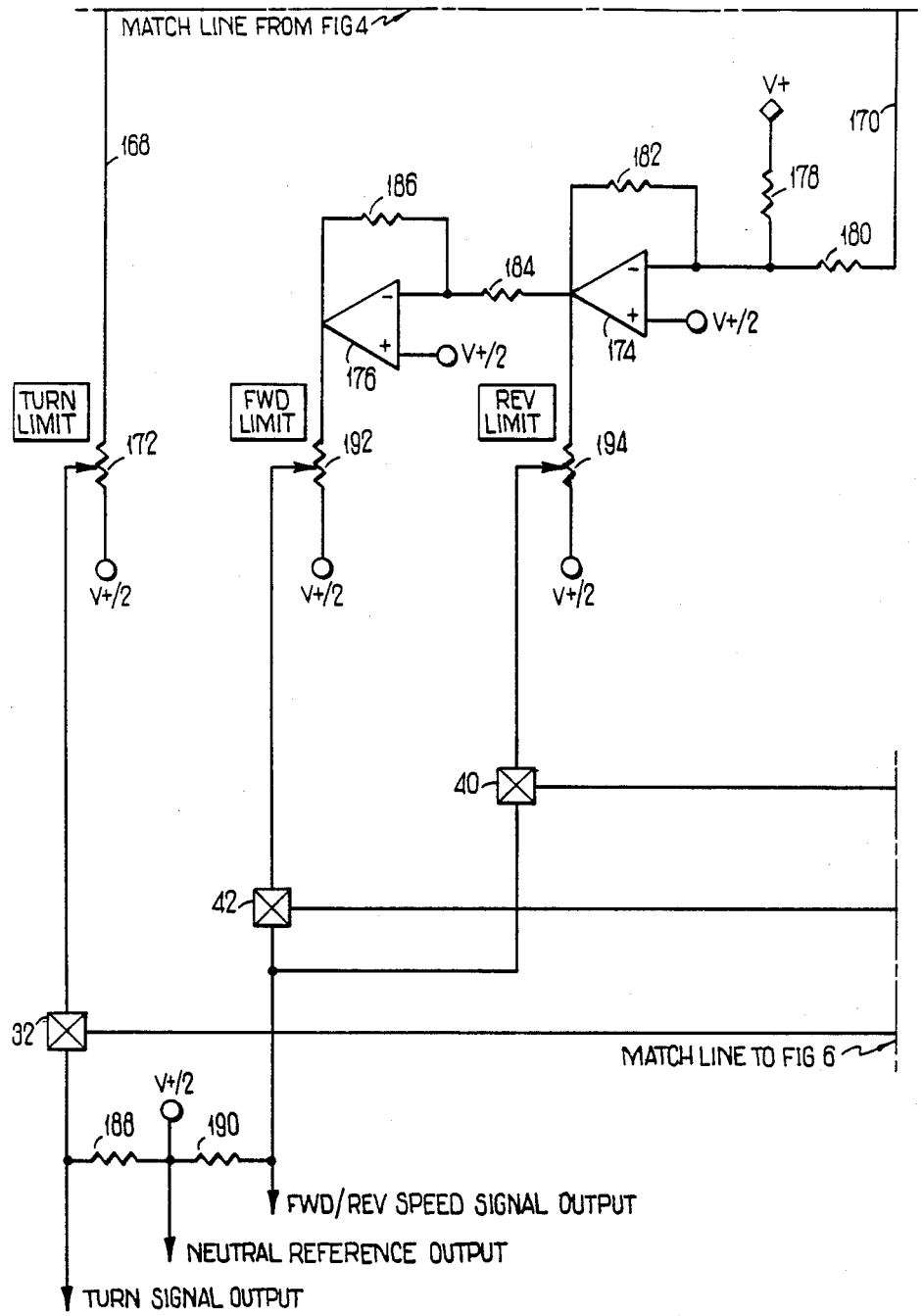
FIG. 5 is a schematic diagram of a preferred embodiment of the linear analog bilateral switches and reverse and forward circuitry illustrated in the block diagram of FIG. 1 and is connected to FIGS. 4 and 6 along the match lines.

FIG. 5 illustrates a means of implementing the turn input and speed input signals to actually provide control signals to a wheelchair controller. In the control scheme, stop motion in a forward direction is achieved when the head is all the way back against the head rest 248 (FIG. 7). Forward motion is achieved by moving the head away from the head rest with one coded input to the system and reverse motion is achieved by moving the head away with another coded input. The turn input at point 168 is run straight through turn limiting potentiometer 172. The turn limiting potentiometer 172 is returned to the reference voltage +V/2. The signal is then run through LABS 32 and sent as an output when the switch 32 is enabled.

The speed input signal from point 170 is additionally processed by amplifiers 174 and 176. The speed input signal varies from zero volts when the head is close to the headrest to a maximum of nearly supply voltage when the head is at a far distance. This is level shifted by a network of two identical resistors 178 and 180. Therefore, when the input is zero volts, the input to amplifier 174 will be in fact one half of the supply voltage. As the speed signal input increases in a positive going direction, this causes a swing in a negative direction from +V/2 in the output of amplifier 174, a simple inverting amplifier referenced to +V/2 whose gain is determined by the value of resistor 182, such that full swing in the negative direction is of a magnitude as desired at that point. This signal is further inverted by a unity gain inverter 176 with resistors 184 and 186 and again referenced to +V/2. This amplifier's output will swing now in a positive direction from +V/2 with increase in input at speed signal input 170. This can be represented as the forward drive signal and the output of amplifier 174 can be represented as the reverse drive signal. Both of these outputs are selected by either LABS 42 or 40 depending upon whether reverse direction drive or forward drive is enabled. The selected speed direction signal is now provided as a speed control output to the wheelchair controller.

The outputs of switches 40 and 42 can be connected together since a wheelchair can go in only one direction at a time. Resistors 188 and 190 are connected to +V/2 and to the output of switch 32 and the combined outputs of switches 40 and 42. A neutral reference output is provided by direct connection to +V/2. The values of resistors 188 and 190 should be approximately five times the value of the potentiometers that are chosen. That is, potentiometer 172 used for the turn limit, potentiometer 192 used for the forward limit, and potentiometer 194 used for the reverse limit. The resistors provide a stop output command when all switches are open by reducing the voltage at the outputs to the reference voltage. The output signals at this point must be further processed to actually operate a wheelchair. Standard simple circuitry appropriate for a particular wheelchair is all that is necessary to interface this control circuitry to emulate the standard joystick and be plugged into the wheelchair motor drive controller.

Figure 6:
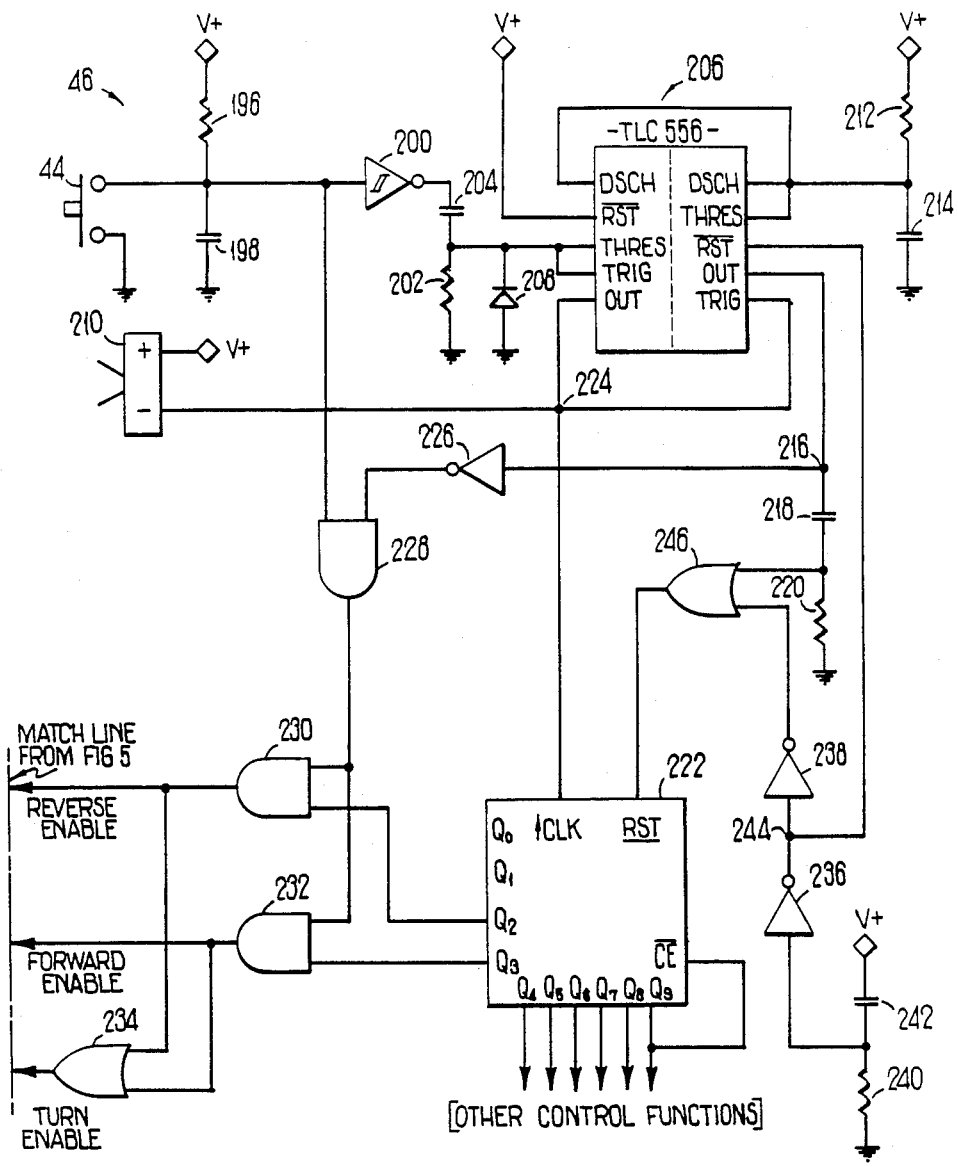
FIG. 6 is a schematic diagram of a preferred embodiment of the head switch and enable logic circuitry illustrated in the block diagram of FIG. 1 and is connected to FIG. 5 along the match line.

Referring now to FIGS. 6 and 7, the circuitry illustrated will generate the reverse enable input, forward enable input, and turn enable inputs to operate switches 32, 40 and 42 shown in FIG. 5. A head operated switch 44 is located on the head rest 248 of the wheelchair 51 preferably centrally located between the left and right sensor plates 50 and 53. When installed the electronic circuitry is covered by the upholstery material of the wheelchair and is invisible so that the head never physically contacts the head switch or the sensor plates. It has been found experimentally, that to provide the maximum temperature stable operation of this circuit, the dielectric material in the head rest should be such that it has a stable dielectric constant with temperature change, a stable power factor with temperature change, and a low coefficient of thermal expansion. Polyethylene proves to be a very good material.

As mentioned, it is not necessary for any part of the body to physically touch any part of the wheelchair for the purpose of making electrical contact. The head switch 44 is activated by the back of the user's head to produce a simple numerical code to select wheelchair operation, for example, one for stop, two for reverse, and three for forward. The switch 44 is a normally open single pole switch that provides an input to a pull-up resistor 196 and debounce capacitor 198. The effective switch deactivation time should be approximately 100 milliseconds arrived at by an appropriate choice of the RC time constant of resistor 196 and capacitor 198.

The switch signal is input to an inverting Schmitt trigger 200 to square up the signal. The output of the Schmitt trigger 200 is differentiated by a network of resistor 202 and capacitor 204 to produce a drive to an integrated timing circuit 206. The integrated timing circuit 206 is preferably a dual integrated timing circuit, such as a TLC 556 for example. The left side of the timer 206 is used as a negative going one-shot multivibrator whose time of operation is determined by the time constant of capacitor 204 and resistor 202. The function of diode 208 is to prevent negative drive excursions into the timer during the discharge of capacitor 204 that could be harmful to the timer 206. The output of this negative going one-shot is used for several purposes. One purpose is to activate a switch signal 210 that can be a piezo buzzer to indicate to the user that switch closure has been achieved. Since there is no other indication of switch action, it is necessary to provide some type of feedback for the user.

The output is also used to trigger a positive going monostable multivibrator that is connected by means of the second half of the dual timer 206. Trigger input starts the operation. The output is a positive going signal having a duration of approximately 1.3 seconds as determined by the timing network of resistor 212 and capacitor 214. It has been found that approximately 1.3 seconds proves to be a satisfactory acceptance time for the numerically coded message fed in. This positive going monostable multivibrator is configured to be resettable at each trigger input by means of connecting the discharge output of the left half of the timer 206 in parallel with the discharge output of the right half effectively discharging capacitor 214 each time a trigger is fed to it. This allows the timing period to be extended indefinitely and not complete until 1.3 seconds after the last switch closure input.

As configured, the circuit is used to provide two useful outputs, the output at point 216 from the monostable multivibrator is used first for two purposes. First, on the initial turn-on state, the rising pulse is differentiated by capacitor 218 and resistor 220 to provide a reset pulse for decade counter 222, such as a CD 4017 for example, restoring the circuit's count to zero. The output of the left half negative going one-shot finds its third use as a clock signal for the decade counter 222. Clocking of this counter occurs on the positive going edge of the input pulse; thus when the one-shot completes its cycle, the counter 222 is clocked one step up putting the output at Q1. If additional switch closures are fed in the acceptance timer right half of 206 is held from completing; however, a new clock pulse is generated at point 224 advancing, on the rising edge, counter 222 to the two state or three state depending on the sequence of counts on the input switch.

Upon termination of further inputs to the switch, the acceptance timer times out and then performs its second function, turning on the selected code. This is accomplished by digital inverter 226 inverting the zero output level of the right half of timer 206, or the monostable multivibrator, giving a positive signal combining with a positive signal from the head switch. The head switch is in fact connected to gate 228 that is simultaneously fed to gates 230 and 232, which will now be turned on depending upon which coded output appears from counter 222, either a two or a three or none. Depending upon the code selected, an output is enabled, either reverse enable, forward enable, or no enable. When either reverse enable or forward enable is selected, OR gate 234 activates the turn control for the wheelchair.

Other outputs of the counter 22 or input codes greater than three are possible for other control functions of the wheelchair or other applications such as operating a wheelchair power recliner or operating an external environmental control unit from the wheelchair. Which ever numerical value of output is the highest used should be tied to the clock enable input of the counter 222 to inhibit count past that numerical value. On power-up, a reset of the logic circuitry is necessary and is accomplished by digital inverters 236 and 238. The differentiating circuit resistor 240 and capacitor 242 provide a time constant such that a negative going reset pulse appears at point 244 lasting approximately 100 milliseconds upon initial power-up. This signal is used to reset monostable multivibrator 206, right half, and an inverted version is used to reset the decade counter 222 via OR gate 246 into the reset input of the decade counter 222.

On output at point 224 the negative going one-shot should have a duration of twelve to fifteen millliseconds in pulse width. This width is chosen to provide an adequate audio signal which it drives. Also, it must be of sufficient length to allow reset operation of the decade counter prior to clocking.

While operation of the electronic sensing and control circuitry is believed to be apparent from the foregoing description, a few words will be added for emphasis. When used for wheelchair control, the electronic sensing and control circuitry is activated by the wheelchair user. The user contacts the centrally located head switch in the head rest three times with the back of his head to enable forward drive and to provide audio feedback indicating operation of the head switch. The user tilts his head forward from the surface of the head rest to produce forward motion. The speed attained is proportional to the degree of forward tilt of the head. The user tilts his head laterally to produce corresponding turns. The rate of turn is proportional to the degree of lateral tilt. Turning can be accomplished with or without forward speed. The forward speed reduces to zero upon return of the head to the surface of the head rest and the turn rate reduces to zero upon return of the head to a vertical position. The user contacts the head switch once to instantly diable drive and is free to move his head without inducing wheelchair motion.

The user contacts the head switch two times to enable reverse drive. In reverse drive the wheelchair control is as in forward drive except that forward tilt produces rearward motion instead of forward motion. In the reverse direction the turn control is unchanged from turn control in the forward direction with left tilt of the head producing left turning motion and right tilt of the head producing right turning motion.

When using the sensing and control circuit for controlling operation of a motorized wheelchair, the user is in complete control and decides whether to move forward or backward by depressing head switch 44 in rapid succession. By rapid succession it is meant that the head switch is successively operated within a time period preferably not exceeding 1.3 seconds between operations.

Thus, to move backward, the operator depresses the head switch twice in rapid succession to obtain a two output from counter 222 enabling gate 230 which provides a reverse enable output to operate LABS 40 so that the wheelchair can move in the reverse direction. To move in the foward direction, the head switch must be activated three times in rapid succession to obtain a three output from the counter 222 to activate gate 232 to put out a forward enable signal activating LABS 42 so that the wheelchair can move forward. Operation of either gate 230 or 232 will provide an input for OR gate 23. OR gate 234 produces the turn enable output signal activating LABS 32 to control the turn signal output for controlling turning of the wheelchair.

After the user has determined whether to move forward or backward, he then decides how fast to go and whether to go in a straight path or in a curved path to the left or right. To move forward at a slow speed the user simply tilts his head forward away from the head rest a slight distance causing the capacitance between the left and right sensors to change and be measured generating left and right current signals. These current signals are converted to voltage signals that are then simultaneously subtracted and added The added signals are corrected for geometry and processed through a ramping circuit. The ramping circuit provides both forward and reverse drive signals; but, because the forward enable logic has been activated, the chair will move in the forward direction rather than the reverse direction. The greater the input to the ramping circuit the faster will be the speed of the wheelchair. The input to the ramping circuit is greater when the distance between the sensor and the head is greater to give proportional control.

While moving forward, to turn to the left, the operator simply tilts his head toward the left. Again, the turning motion to the left will vary with the distance the head move to the left. Moving the head toward the left causes an imbalance between the capacitance of the head and the left sensor and the head and the right sensor increasing the difference output of the subtracting circuit 22. The output of the subtracting circuit increases, yielding an increasing turn signal so that the wheelchair turns to the left. The opposite is true when it is desired to turn to the right. The same is true when the chair is operating in the reverse direction. That is, moving the head to the left causes the chair to turn to the left and moving the head to the right causes the chair to move to the right while travelling in the reverse direction. Also, tilting the head forward causes the chair to move at a faster rate as the degree of tilt away from the headrest increases.

While the invention has been described with reference to the preferred embodiments, it will be understood by those skilled in the art that various changes may be made and equivalents may be substituted for elements of the preferred embodiments without departing from the invention. In addition, many modifications may be made to adapt a particular situation and material to a teaching of the invention without departing from the essential teachings of the present invention. For example, while the invention has been described as a wheelchair control system for enabling a wheelchair user to maneuver the wheelchair using simple, natural head motion based on the principle of electrical capacitance change with the distance between sensor elements and the user's head, the sensing circuitry works with any body part or body tissue mass or any dielectric or electrically conductive object. The sensing circuits require no physical or mechanical contact with the user so that it is not necessary to attach devices to the user. The sensors can be embedded invisibly in the wheelchair headrest and located entirely behind the user's head providing cosmetic benefit and great convenience.

A single sensor provides one-dimensional positional data while a two sensor system provides two-dimensional positional data proportional to body part movement, such as head forward tilt and head lateral tilt. The forward and lateral movement of the head required for wheelchair control is natural, simple, low effort and of limited range so that a person with limited head mobility can effectively maneuver a wheelchair using the electronic sensing and control circuitry of the present invention. The wheelchair head control embodiment is intuitive to the user resulting in a quickly learned, precise maneuvering ability up to full speed capability. While the electronic sensing and control circuitry operates with very limited head movement, it can operate with a full range of head motion as great as perhaps six inches to as little as a fraction of a inch. Thus, wheelchair users desiring to use the electronic sensing and control system for wheelchair control rather than other types of wheelchair controls, such as a joystick for example, can still use natural head movement to maneuver the wheelchair. The circuitry provides a high rate of positional sensing data to achieve real-time wheelchair control.

The electronic sensing and control circuitry can replace the standard joystick control unit in a wheelchair and plug directly into an unmodified motor drive controller. The circuitry emulates a standard joystick control unit, but has the advantage of greater physical durability due to the fact that there is no contact with the body unlike a joystick which must be handled by the user.

As is evident from the foregoing description, certain aspects of the invention are not limited to the particular details of the examples illustrated, and it is therefore contemplated that other modifications or applications will occur to those skilled in the art. It is accordingly intended that the claims shall cover all such modifications and applications as do not depart from the true spirit and scope of the invention.

What is claimed is:

1. An electronic circuit for sensing the distance to an object, comprising:
   a single sensing plate spaced from said object;
   means for charging said sensing plate to a value dependent upon a capacitance existing between said sensing plate and said object, said capacitance varying with the position of said object relative to said sensing plate;
   means for sampling the charging current of said sensing plate;
   means for outputting said sampled current, said output current being proportional to said capacitance and varying with the distance between said sensing plate and said object; and
   means for providing an opposing current flow equal to any current flow attributable to any residual capacitance of the electronic circuit so that it is only necessary to detect the change of capacitance involved in distance measuring.

2. The electronic circuit of claim 1, including means for converting said sampled output current to a voltage varying with the distance between said sensing plate and said object.

3. An electronic circuit for sensing the distance to an object comprising:
   a sensing plate;
   a first switch operable to effect discharge of said sensing plate;
   a second switch operable to effect a path for outputting sampled charging of said sensing plate, said output current being proportional to a capacitance existing between said sensing plate and said object and varying with the distance between said sensing plate and said object;
   a third switch operable to control charging of sais sensing plate through a current sampling means and provide a path for outputting the sampled current; and
   a fourth switch operable to effect an opposing current flow equal to a current flow generated by a residual capacitance of said circuit, so that only the change of capacitance involved in distance measuring is detected, and the opposing current flow is opposite to that current flow which came during the switch on time effectively neutralizing said residual current.

4. The electronic circuit of claim 3, wherein said first, second, third and fourth switches are linear analog bilateral switches and including means for driving said switches synchronously thereby making said circuit immune to radio frequency field interference.

5. The electronic circuit of claim 3, including a square wave oscillator simultaneously driving said switches.

6. The electronic circuit of claim 1, including means for compensating for nonlinear capacitance change with distance between said object and said sensing plate.

7. The electronic circuit of claim 1, including means for utilizing a logarithmic relationship existing between forward-voltage and forward-current of a silicon diode to compensate for nonlinear capacitance change with distance between said sensing plate and said object.

8. An electronic circuit for sensing the distance to a dielectric or electrically conducting object, comprising:
   a sensing plate;
   a first switch operable to effect discharge of said sensing plate and produce a current sample;
   a second switch operable to effect a path for outputting said sampled current;
   a third switch operable to control charging of said sensing plate and provide a path for outputting the sampled current;
   a fourth switch operable to effect an opposing current flow equal to a current flow generated by a residual capacitance of said circuit, so that only the change of capacitance involved in distance sensing is detected, said opposing current flow being opposite to current flowing during the switch-on time, effectively neutralizing said residual current; and
   a square wave oscillator simultaneously driving said switches thereby controllably charging said sensing plate in proportion to the capacitance existing between said sensing plate and said object and sampling said sensing plate charging current to produce a sampled output current directly proportional to said capacitance and varying with the distance between said sensing plate and said object.

9. The electronic circuit of claim 8, including a current-to-voltage converter receiving said sampled output current and delivering a voltage varying with the capacitance between said sensing plate and said object.

10. The electronic circuit of claim 9, including means for compensating for nonlinear capacitance change with distance.

11. The electronic circuit of claim 9, including means for utilizing the logarithmic relationship between forward-voltage and forward-current of a silicon diode to compensate for the nonlinear capacitance change with distance.

12. An electronic circuit for sensing the distance to a dielectric or electrically conducting object, said electronic circuit having a residual capacitance, comprising:
   a sensing plate forming a capacitor with said object, the capacitance existing between said sensing plate and said object varying with the position of said object relative to said sensing plate;
   a first resistor having a first end connected to said sensing plate;
   a second resistor having a first end connected to said sensing plate;
   a third resistor having a first end connected to a second end of said second resistor;
   a fourth resistor having a first end connected to a voltage source and a second end coupled to said first end of said third resistor and to said second end of said second resistor;
   a fifth resistor having a first end coupled to said voltage source;
   a capacitor having a first end connected to said second end of said fourth resistor and having a second end connected to said first end of said third resistor and said second end of said second resistor;
   a first switch connected to a second end of said first resistor and operable to effect discharge of said sensing plate through said first resistor;
   a second switch connected to a second end of said third resistor and operable to effect a path for outputing said sampled current through said capacitor and third resistor;
   a third switch connected to a second end of said fourth resistor and said first end of said capacitor and operable to control charging of said sensing plate from said voltage source through said second and fourth resistors and said capacitor, said capacitor acquiring a sample of charging current, said third switch providing a path for outputting said sampled current; and
   a fourth switch connected to a second end of said fifth resistor and operable to effect an opposing current flow through said fifth resistor equal to a current flow generated by said residual capacitance of said circuit, so that only the change of capacitance involved in distance sensing is detected, said opposing current flow being opposite to the current flow which came during the switch on time effectively neutralizing said residual current.

13. The electronic circuit of claim 12, wherein said second resistor prevents rapid discharge of said capacitor during switch close time to facilitate delivery of the bulk of the charge in said capacitor to an output point.

14. The electronic circuit of claim 13, wherein the current at said output point varies inversely proportional with distance between said object and said sensing plate and increases rapidly as the distance approaches zero.

15. The electronic circuit of claim 12, including a square wave oscillator simultaneously driving said switches to controllably charge said sensing plate in proportion to the capacitance existing between said sensing plate and said object, and sampling said sensing plate charging current to produce sampled output current directly proportional to said capacitance and thereby varying with the distance between said sensing plate and said object.

16. An electronic circuit for sensing the position of a dielectric or electrically conducting object, comprising:
- a first sensing plate forming a capacitor with said object, the capacitance existing between said first sensing plate and said object varying with the position of said object relative to said first sensing plate;
- a second sensing plate forming a capacitor with said object, the capacitance existing between said second sensing plate and said object varying with the position of said object relative to said second sensing plate;
- means for charging each of said first and second sensing plates in proportion to the capacitance existing between each of said sensing plates and said object;
- means for sampling the charging current of said first and second sensing plates producing first and second signals proportional to said capacitance between each of said first and second sensing plates and said object, said capacitance varying with the position of said object relative to said sensing plates;
- means for subtracting said first and second signals and deriving a lateral displacement signal; and
- means for summing said first and second signals and deriving a distance signal therefrom.

17. The electronic circuit of claim 16, including means for deriving a distance correction signal from said lateral displacement signal which varies with lateral displacement of said object from a neutral position near said sensor plates, and summing said correction signal along with said first and second signals to compensate for nonlinearity of said distance signal.

18. The electronic circuit of claim 16, including means for altering the amplitude of said lateral displacement signal using said distance signal to compensate for nonlinearity of said lateral displacement signal which varies with the distance of said object from said sensor plates.

19. The electronic circuit of claim 16, including a gain control amplifier altering the amplitude of said lateral displacement signal in response to said distance signal and compensating for nonlinearity of said lateral displacement signal which varies with the distance of said object from said sensor plates.

20. The electronic circuit of claim 16, including means for converting said first and second signals to first and second voltage signals.

21. The electronic circuit of claim 16, including means for compensating for nonlinear capacitance change with distance.

22. The electronic circuit of claim 16, including means for utilizing the logarithmic relationship between forward voltage and forward current of a silicon diode to compensate for nonlinear capacitance change with distance.

23. The electronic circuit of claim 16, including means for receiving said lateral displacement and distance signals, providing response time filtering and producing a wheelchair control output for controlling forward, reverse and turning motion of a motorized wheelchair.

24. The electronic circuit of claim 16, including means for providing response time filtering for blocking erratic inputs caused by inertially induced movement of said object.

25. The electronic circuit of claim 23, wherein said means includes:
- a ramping circuit receiving said lateral displacement signal and producing a linear time ramp output; and
- a buffer amplifier receiving said linear time ramp output and delivers a turn output.

26. The electronic circuit of claim 25, wherein said buffer amplifier receives a portion of said lateral displacement signal and delivers a turn output requiring no further processing.

27. The electronic circuit of claim 23, wherein said means includes:
- a ramping circuit receiving said distance signal and producing a linear time ramp output signal; and
- means for level shifting said linear time ramp output signal and producing forward and reverse wheel chair control signals.

28. An electronic circuit for sensing the distance to an object, comprising:
- a first sensing plate;
- means for charging said first sensing plate to a value dependent upon a capacitance existing between said first sensing plate and said object, said capacitance varying with the position of said object relative to said first sensing plate;
- means for sampling the charging current of said sensing plate;
- means for outputting said sampled current, said output current being proportional to said capacitance and varying with the distance between said first sensing plate and said object;
- means for converting said first sampled output current to a first voltage signal varying with the distance between said first sensing plate and said object;
- a second sensing plate;
- means for charging said second sensing plate to a value dependent upon a capacitance existing between said second sensing plate and said object, said capacitance varying with the position of said object relative to said second sensing plate;
- means for sampling the charging current of said sensing plate;
- means for outputting said sampled current, said output current being proportional to said capacitance and varying with the distance between said second sensing plate and said object;
- means for converting said second sampled output current to a second voltage signal varying with the distance between said second sensing plate and said object; and
- means for receiving said first and second voltage signals and producing an output signal having a component representative of the distance of said object from said plates collectively and a component proportional to the lateral displacement of said object between said plates.

29. An electronic circuit for sensing the position of a user's head for controlling operation of a motorized wheel chair, comprising:
- a first sensing plate forming a capacitor with the head, the capacitance existing between said first sensing plate and the head varying with the position of the head relative to said first sensing plate;
- a second sensing plate forming a capacitor with the head, the capacitance existing between said second sensing plate and the head varying with the position of the head relative to said second sensing plate;
- means for charging each of said first and second sensing plates in proportion to the capacitance existing between each of said sensing plates and the head;
- means for sampling the charging current of said first and second sensing plates producing first and second signals proportional to said capacitance between each of said first and second sensing plates and the head, said capacitance varying with the position of the head relative to said sensing plates;
- means for subtracting said first and second signals and deriving a lateral displacement signal for controlling turning motion of said wheel chair; and
- means for summing said first and second signals and deriving a distance signal therefrom for controlling forward and reverse motion of said wheel chair.

30. The electronic circuit of claim 29, including means for deriving a distance correction signal from said lateral displacement signal which varies with lateral displacement of the head from a neutral position near said sensor plates, and summing said correction signal along with said first and second signals to compensate for nonlinearity of said distance signal.

31. The electronic circuit of claim 30 including means for altering the amplitude of said lateral displacement signal using said distance signal to compensate for nonlinearity of said lateral displacement signal which varies with the distance of the head from said sensor plates.

32. The electronic circuit of claim 30, including a gain control amplifier altering the amplitude of said lateral displacement signal in response to said distance signal and compensating for nonlinearity of said lateral displacement signal which varies with the distance of the head from said sensor plates.

33. The electronic circuit of claim 30, including means for converting said first and second signals to first and second voltage signals.

34. The electronic circuit of claim 30, including means for compensating for nonlinear capacitance change with distance.

35. The electronic circuit of claim 30, including means for utilizing the logarithmic relationship between forward voltage and forward current of a silicon diode to compensate for nonlinear capacitance change with distance.

36. The electronic circuit of claim 30, including means for receiving said lateral displacement and distance signals, providing response time filtering and producing an output for controlling forward, reverse and turning motion of said motorized wheelchair.

37. The electronic circuit of claim 36, wherein said means includes:
- a ramping circuit receiving said lateral displacement signal and producing a linear time ramp output; and
- a buffer amplifier receiving said linear time ramp output and delivering a turn output.

38. The electronic circuit of claim 36, wherein said buffer amplifier receives a portion of said lateral displacement signal and delivers a turn output requiring no further processing.

39. The electronic circuit of claim 36, wherein said means includes:
- a ramping circuit receiving said distance signal and producing a linear time ramp output signal; and
- means for level shifting said linear time ramp output signal and producing forward and reverse wheel chair control signals.

40. The electronic circuit of claim 30 including means for providing response time filtering for blocking erratic inputs caused by inertially induced movement of said user's head.

41. The electronic circuit of claim 30, wherein said circuit is immune to radio frequency field interference.

* * * * *